(12) United States Patent
Sychev et al.

(10) Patent No.: US 11,202,099 B2
(45) Date of Patent: Dec. 14, 2021

(54) APPARATUS AND METHOD FOR DECODING A PANORAMIC VIDEO

(71) Applicant: Huawei Technologies Co., Ltd., Shenzhen (CN)

(72) Inventors: Maxim Borisovitch Sychev, Moscow (RU); Alexis Decurninge, Boulogne Billancourt (FR); Dimitrios Tsilimantos, Boulogne Billancourt (FR); Alexander Alexandrovich Karabutov, Moscow (RU); Stefan Valentin, Boulogne Billancourt (FR); Sergey Yurievich Ikonin, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 16/733,984

(22) Filed: Jan. 3, 2020

(65) Prior Publication Data
US 2020/0145694 A1    May 7, 2020

Related U.S. Application Data

(63) Continuation of application No. PCT/RU2018/000164, filed on Mar. 16, 2018.

(30) Foreign Application Priority Data

Jul. 5, 2017  (WO) ................ PCT/RU2017/000489

(51) Int. Cl.
*H04N 19/597*    (2014.01)
*H04N 13/161*    (2018.01)
(Continued)

(52) U.S. Cl.
CPC ............. *H04N 19/597* (2014.11); *G06T 3/60* (2013.01); *H04N 5/23238* (2013.01);
(Continued)

(58) Field of Classification Search
None
See application file for complete search history.

(56) References Cited

U.S. PATENT DOCUMENTS

| 4,807,158 A | 2/1989 | Blanton et al. |
| 6,205,260 B1 | 3/2001 | Crinon et al. |

(Continued)

FOREIGN PATENT DOCUMENTS

| WO | 2005093661 A3 | 12/2005 |
| WO | 2016064862 A1 | 4/2016 |

OTHER PUBLICATIONS

Guan, "Spherical image processing for immersive visualisation and view generation," Doctorate Thesis, pp. 1-133, School of Computing, Engineering and Physical Sciences at the University of Central Lancashire, Preston, England (Nov. 2011).
(Continued)

*Primary Examiner* — Edemio Navas, Jr.
(74) *Attorney, Agent, or Firm* — Leydig, Voit & Mayer, Ltd.

(57) ABSTRACT

A system and method for improving quality of encoding and decoding a panoramic video. The panoramic video comprises a sequence of encoded picture frames. In panoramic video picture frames are mapped on a spherical viewing area. In the method the projection center of the encoded frame is transformed before encoding. In the decoding phase the projection center is transformed back accordingly after decoding the frame.

16 Claims, 4 Drawing Sheets

(51) Int. Cl.

| | | |
|---|---|---|
| *H04N 5/232* | (2006.01) | |
| *H04N 19/517* | (2014.01) | |
| *H04N 19/105* | (2014.01) | |
| *H04N 19/139* | (2014.01) | |
| *H04N 19/172* | (2014.01) | |
| *H04N 19/527* | (2014.01) | |
| *G06T 3/60* | (2006.01) | |

(52) U.S. Cl.
CPC ......... *H04N 13/161* (2018.05); *H04N 19/105* (2014.11); *H04N 19/139* (2014.11); *H04N 19/172* (2014.11); *H04N 19/517* (2014.11); *H04N 19/527* (2014.11)

(56) References Cited

U.S. PATENT DOCUMENTS

| | | | |
|---|---|---|---|
| 7,084,877 | B1 | 8/2006 | Panusopone et al. |
| 2004/0169724 | A1 | 9/2004 | Ekpar |
| 2007/0189392 | A1 | 8/2007 | Tourapis et al. |
| 2015/0341654 | A1 | 11/2015 | Zhou et al. |
| 2016/0112489 | A1 | 4/2016 | Adams et al. |
| 2016/0142697 | A1 | 5/2016 | Budagavi et al. |
| 2017/0118475 | A1 | 4/2017 | Chang et al. |
| 2018/0278916 | A1* | 9/2018 | Kim ........................ H04N 5/247 |
| 2019/0012766 | A1* | 1/2019 | Yoshimi ............. H04N 5/23238 |
| 2019/0108611 | A1* | 4/2019 | Izumi .................... G06T 3/0062 |

OTHER PUBLICATIONS

Boyce et al., "Spherical rotation orientation SEI for HEVC and AVC coding of 360 video," Joint Collaborative Team on Video Coding (JCT-VC) of ITU-T SG16 WP3 and ISO/IEC JTC1/SC29/WG 1,Geneva, Switzerland, JCTVC-Z0025, pp. 1-7, International Telecommunication Union, Geneva, Switzerland (Jan. 12-20, 2017).

Smolić et al., "Long-Term Global Motion Estimation and Its Application for Sprite Coding, Content Description, and Segmentation," IEEE Transactions on Circuits and Systems for Video Technology, vol. 9, No. 8, pp. 1227-1241, Institute of Electrical and Electronics Engineers, New York, New York (Dec. 1999).

* cited by examiner

APPARATUS AND METHOD FOR DECODING A PANORAMIC VIDEO

CROSS-REFERENCE TO RELATED APPLICATIONS

This application is a continuation of International Application No. PCT/RU2018/000164, filed on Mar. 16, 2018, which claims priority to International Patent Application No. PCT/RU2017/000489, filed on Jul. 5, 2017. The disclosures of the aforementioned applications are hereby incorporated by reference in their entireties.

TECHNICAL FIELD

The present disclosure relates to the field of video stream processing. Particularly, the disclosure relates to improving of panoramic video encoding and decoding.

BACKGROUND

Visual information has an important role in various electronic devices. These devices include, for example, mobile phones, table computers, ordinary computers, television sets, movie theaters, virtual reality glasses and similar. The quality of visual information has been continuously increased through introduction of larger resolutions, color depths and similar. Visual information may be shown as conventional two-dimensional pictures or video streams or in three-dimensional form.

The recent developments in three-dimensional video, for example in games or other virtual reality applications, have made three-dimensional video applications popular.

Three-dimensional video is typically recorded using a plurality of cameras or a special camera having multiple lenses and picture sensors. The pictures captured using multiple cameras or multiple picture sensors are stitched into one video piece that is also known as panoramic video, immerse video or spherical video. In addition to higher resolutions and color depths, the three-dimensional imaging increases the amount of information content. As transmission mediums, such as network connections or optical discs, have a limited capacity pictures and particularly videos need to be encoded for transmission. In encoding, the picture or video is typically compressed in order to reduce required transmission capacity. After transmission the picture or video is decoded for display or other suitable use.

The decision how to encode and decode depends on different factors. The methods may be determined, for example, on content basis. There may be several constraints, for example on available computing resources and timing requirements that may force to use particular coding schemes. Thus, there is a continuous need for providing new coding schemes and improving the existing ones so that better coding results can be provided under diverse environments.

SUMMARY

A system and method for improving quality of encoding and decoding a panoramic video is provided. The panoramic video comprises a sequence of encoded picture frames. In panoramic video picture frames are mapped on a spherical viewing area. In the method the projection center of the encoded frame is transformed before encoding. In the decoding phase the projection center is accordingly transformed after decoding the frame.

In an aspect, a picture decoding apparatus comprising processing circuitry is disclosed. The processing circuitry is configured to receive an encoded panoramic picture. Then the processing circuitry is configured to decode the received encoded panoramic picture and compute a geometrical transformation in accordance with a replacement vector, which replacement vector is included with the encoded panoramic picture and the replacement vector determines a difference between the projection center of the received panoramic picture and a projection center of a constructed panoramic output picture. Finally the processing circuitry is configured to construct the panoramic output picture, wherein the processing circuitry is further configured to transform the decoded panoramic picture in accordance with the computed geometrical transformation.

According to the aspect the projection center can be transformed so that more details are extracted in the decoding process. Thus, the decoded picture contains more details and is of higher quality. The higher quality pictures are desired as they can take the advantage of high resolutions and dynamics of modern display devices.

In an implementation of the aspect the geometrical transformation is a backward transformation from a replaced projection center to an original projection center. It is beneficial to use in decoding a backward transformation from a replaced projection center to an original projection center. The backward transformation corresponds with a forward transformation performed during the encoding. It is possible to use several different transformations including zoom, perspective change, rotation, panning and similar.

In an implementation of the aspect the processing circuitry is further configured to use a center of the received panoramic picture or the constructed panoramic output picture as a focal point. The possibility to choose the use the center of the received panoramic picture or the constructed panoramic picture provides flexibility to the implementation.

In an implementation of the aspect the processing circuitry is further configured to use the midway point between the center of the received panoramic picture and the center of constructed panoramic picture as a focal point. Using the midway point makes the transformations symmetrical and provides possibility to makes simple implementations.

In a second aspect a picture encoding apparatus comprising a processing circuitry is disclosed. The processing circuitry is configured to receive a panoramic picture; construct a transformed panoramic picture by computing a geometrical transformation of the received panoramic picture; and encode the transformed panoramic, wherein a replacement vector for a projection center is stored with the encoded transformed picture, and the replacement vector comprises a parameter set of the geometrical transformation between the projection center of the received panoramic picture and the projection center of the constructed transformed panoramic picture.

According to the second aspect the projection center can be transformed so that more details can be preserved in the encoding process. Thus, the encoded picture contains more details and is of higher quality. The higher quality pictures are desired as they can take the advantage of high resolutions and dynamics of modern display devices after the encoded pictures are again encoded for display.

In an implementation of the second aspect the geometrical transformation is a forward transformation from an original projection center to a replaced projection center. It is beneficial to use in decoding a forward transformation from an original projection center to a replaced projection center.

The forward transformation corresponds with a backward transformation performed during the decoding. It is possible to use several different transformations including zoom, perspective change, rotation, panning and similar.

In an implementation of the second aspect the processing circuitry is further configured to use a center of the received panoramic picture or the constructed panoramic output picture as a focal point. The possibility to choose the use the center of the received panoramic picture or the constructed panoramic picture provides flexibility to the implementation.

In an implementation of the second aspect the processing circuitry is further configured to use the midway point between the center of the received panoramic picture and the center of constructed panoramic picture as a focal point. Using the midway point makes the transformations symmetrical and provides possibility to makes simple implementations.

In a third aspect a picture decoding method is disclosed. The method comprises receiving an encoded panoramic picture; decoding the received encoded panoramic picture, wherein the method further comprising decoding a panoramic picture and computing a geometrical transformation in accordance with a replacement vector, which replacement vector is included with the encoded panoramic picture and the replacement vector determines a difference between the projection center of the received panoramic picture and a projection center of a constructed panoramic output picture; and constructing the panoramic output picture, wherein the method further comprises transforming the decoded panoramic picture in accordance with the computed geometrical transformation.

According to the third aspect the projection center can be transformed so that more details are extracted in the decoding process. Thus, the decoded picture contains more details and is of higher quality. The higher quality pictures are desired as they can take the advantage of high resolutions and dynamics of modern display devices.

In an implementation of the third aspect the method further comprises the geometrical transformation is a backward transformation from a replaced projection center to an original projection center. It is beneficial to use in decoding a backward transformation from a replaced projection center to an original projection center. The backward transformation corresponds with a forward transformation performed during the encoding. It is possible to use several different transformations including zoom, perspective change, rotation, panning and similar.

In an implementation of the third aspect the method further comprises using a center of the received panoramic picture or the constructed panoramic output picture as a focal point. The possibility to choose the use the center of the received panoramic picture or the constructed panoramic picture provides flexibility to the implementation.

In an implementation of the third aspect the method further comprises using the midway point between the center of the received panoramic picture and the center of constructed panoramic picture as a focal point. Using the midway point makes the transformations symmetrical and provides possibility to makes simple implementations.

In a fourth aspect the method of the third aspect is implemented as a computer program for decoding picture comprising computer program code, which is configured to perform the method when executed in a computing device. It is beneficial to implement the decoding method as a computer program so that the method can be easily implemented and transformed between different types of decoding apparatuses.

In fifth aspect a picture encoding method is disclosed. The method comprises receiving a panoramic picture; constructing a transformed panoramic picture by computing a geometrical transformation of the received panoramic picture; and encoding the transformed panoramic, wherein a replacement vector for a projection center is stored with the encoded transformed picture, and the replacement vector comprises a parameter set of the geometrical transformation between the projection center of the received panoramic picture and the projection center of the constructed transformed panoramic picture.

According to the fifth aspect the projection center can be transformed so that more details can be preserved in the encoding process. Thus, the encoded picture contains more details and is of higher quality. The higher quality pictures are desired as they can take the advantage of high resolutions and dynamics of modern display devices after the encoded pictures are again encoded for display.

In an implementation of the fifth aspect the geometrical transformation is a forward transformation from an original projection center to a replaced projection center. It is beneficial to use in decoding a forward transformation from an original projection center to a replaced projection center. The forward transformation corresponds with a backward transformation performed during the decoding. It is possible to use several different transformations including zoom, perspective change, rotation, panning and similar.

In an implementation of the second aspect the method further comprises using a center of the received panoramic picture or the constructed panoramic output picture as a focal point. The possibility to choose the use the center of the received panoramic picture or the constructed panoramic picture provides flexibility to the implementation.

In an implementation of the second aspect the method further comprises using the midway point between the center of the received panoramic picture and the center of constructed panoramic picture as a focal point. Using the midway point makes the transformations symmetrical and provides possibility to makes simple implementations.

In a sixth aspect the method of the fifth aspect is implemented as a computer program for encoding picture comprising computer program code, which is configured to perform the method when executed in a computing device. It is beneficial to implement the decoding method as a computer program so that the method can be easily implemented and transferred between different types of decoding apparatuses.

The aspects and implementations disclosed above are beneficial in general as they improve the video decoding quality. This provides better use of capacity of existing devices and the user experience can be improved.

DESCRIPTION OF THE DRAWINGS

The present description will be better understood from the following detailed description read in light of the accompanying drawings, wherein.

DETAILED DESCRIPTION

The detailed description, provided below in connection with the appended drawings, is intended as a description of the embodiments and is not intended to represent the only forms in which the embodiment may be constructed or utilized. However, the same or equivalent functions and structures may be accomplished by different embodiments. In the following description decoding is discussed, however, a corresponding encoder includes a similar decoder part.

In the following description a video coding apparatus, a method and a corresponding computer program are disclosed. The description relates to encoding and decoding of a panoramic video. The panoramic video may be, for example of 180 or 360 degrees, and stored into a video stream or other similar encoded sequence of pictures in the form of picture frames of any projection. The decoded picture frames are then mapped to a surface of a sphere forming the panoramic view. Thus, each of the mapped picture frames has a projection center, which can also be determined when the picture frame is stored as a two-dimensional picture frame in the video stream. In the following description the term "projection center" means the center of a sphere on which the panoramic video is projected.

Figure 1:
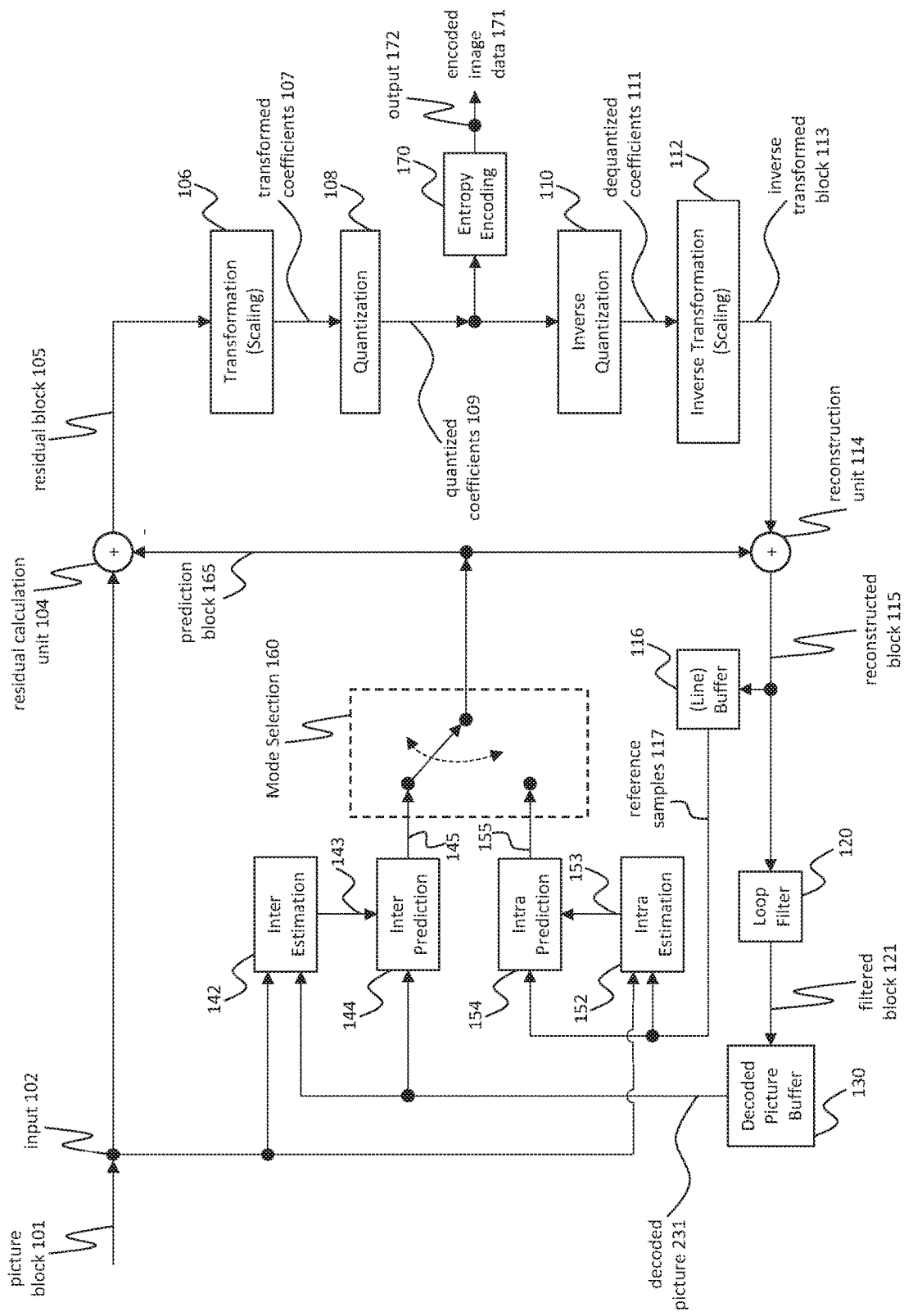
FIG. 1 is a schematic illustration of an encoder.

FIG. 1 shows an encoder 100, which comprises an input 102, a residual calculation unit 104, a transformation unit 106, a quantization unit 108, an inverse quantization unit 110, and inverse transformation unit 112, a reconstruction unit 114, a buffer 116, a loop filter 120, a frame buffer 130, an inter estimation unit 142, an inter prediction unit 144, an intra estimation unit 152, an intra prediction unit 154, a mode selection unit 160, an entropy encoding unit 170, and an output 172.

The encoder 100 receives an input from a preprocessor that is not shown in FIG. 1. The preprocessor is configured to perform one or more preprocessing functions, wherein one of the preprocessing functions is transforming a received panoramic picture using forward transformation and storing a replacement vector according to which the transformation is performed. The encoder is then configured to perform the encoding using a picture block 101 comprising the second transformed picture that is received from the preprocessor at the input 102. The picture block further comprises the replacement vector. The encoder 100 is configured to encode the received picture At the encoding side the picture encoding is performed in conventional manner using the shown encoder and the respective components. However, the encoded picture data (encoded image data) 171 that is provided at the output 172 of the decoder is different also in that sense that the encoded picture data comprises the replacement vector, that may be also encoded, for example, in the entropy encoding block 170, or directly before or after the entropy encoding. As the introduction of the replacement vector does not directly relate to the encoding of the picture data of the picture block 101 it can be done in any suitable location of the encoder. Thus, because of the preprocessing, the encoded picture data 171 differs from the conventional encoding in that the projection center of the encoded picture is different and the encoding result is different. This provides better capability of improving quality as more details can be preserved. A further difference is the introduction of the replacement vector or other set of parameters that can be used for corresponding geometrical transformation.

Figure 2:
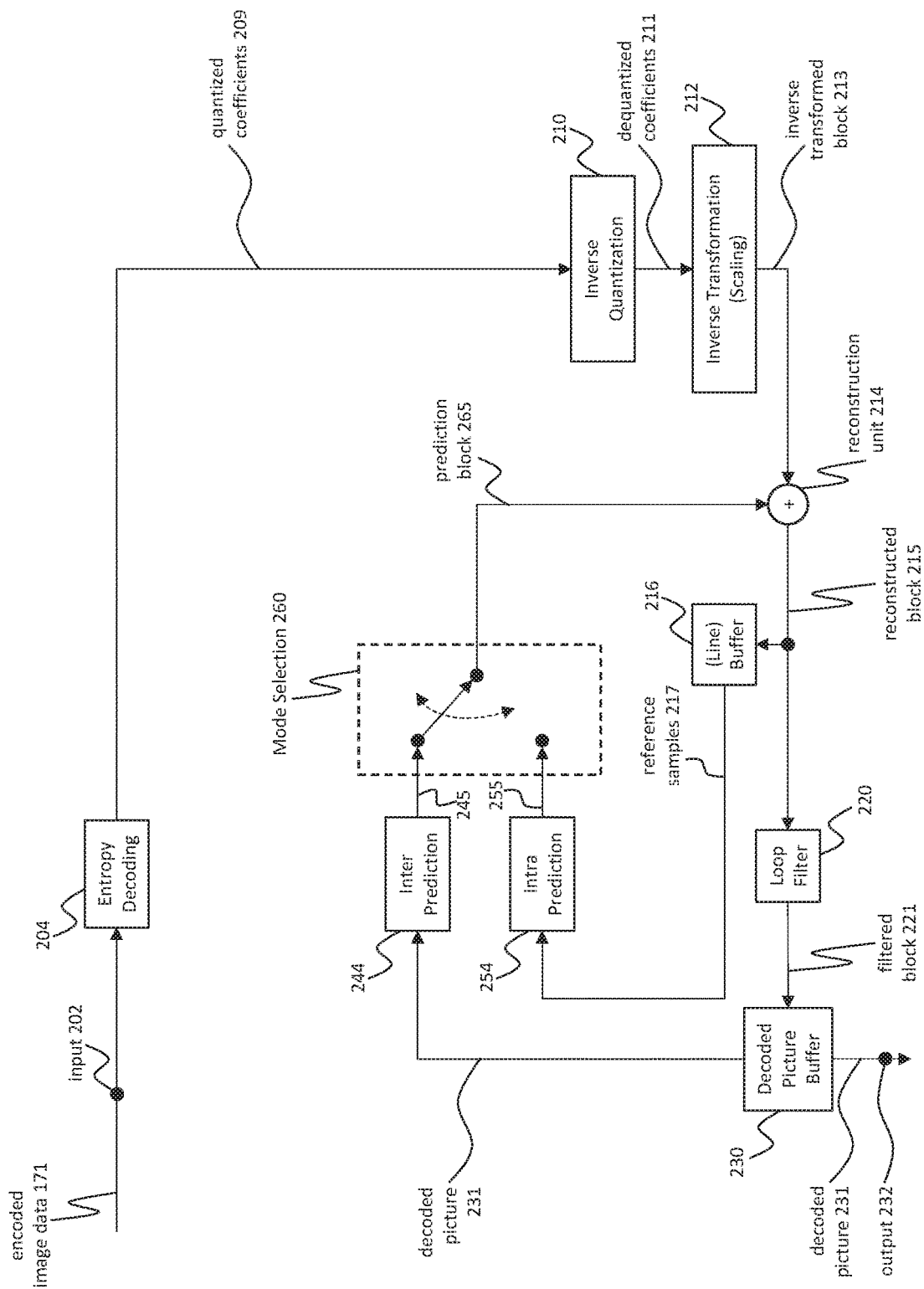
FIG. 2 is a schematic illustration of a decoder.

FIG. 2 shows an exemplary video decoder 200 configured to receive encoded picture data (bitstream) 171, e.g. encoded by encoder 100, to obtain a decoded picture 231. The decoder 200 comprises an input 202, an entropy decoding unit 204, an inverse quantization unit 210, an inverse transformation unit 212, a reconstruction unit 214, a buffer 216, a loop filter 220, a decoded picture buffer 230, an inter prediction unit 244, an intra prediction unit 254, a mode selection unit 260 and an output 232.

In the decoder 200 the encoded picture data 171 comprises picture data of a picture and a replacement vector as explained with regard FIG. 1. The replacement vector may be extracted from the encoded picture data, for example, in conjunction with the entropy encoding 204, or at any other suitable location. The picture is decoded in the conventional manner and the output 232, which is provided to post processing, comprises a decoded picture that corresponds with the second panoramic picture of FIG. 1. Thus, the output is a panoramic picture that has been transformed in accordance with the replacement vector. At the post processing the output picture is transformed using backward transformation to correspond with the original picture which was received at the encoder of FIG. 1.

The expression replacement vector is to be understood as a set of parameters that represents the geometrical difference between the projection centers of the received panoramic picture and the constructed second panoramic picture.

Figure 3:
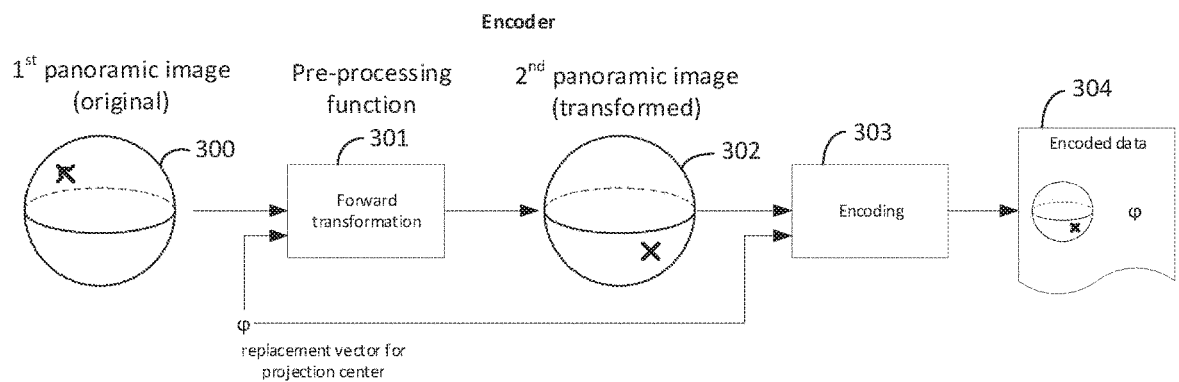
FIG. 3 illustrates an example of encoding process.

In FIG. 3 an example encoding process is shown. In the process, panoramic pictures are received and encoded in order to form a panoramic video. The process starts by receiving a picture belonging to a panoramic video, step 300. In this example the received panoramic picture is nominated as the first panoramic picture. The picture comprises a projection center at an original location. When encoding a video, pictures are preprocessed before encoding. In the process of FIG. 3 the preprocessing step 301 includes receiving the first panoramic picture and a replacement vector for projection center. The replacement vector represents the difference between the projection centers of a received first panoramic picture and the second panoramic picture, which is the constructed panoramic output picture. The projection center of the second panoramic picture is chosen so that more details are preserved when the picture is encoded. Then the preprocessing function processes the received first panoramic picture and the replacement vector by performing a forward transformation for the projection center in accordance with replacement vector. The processing comprises constructing a second panoramic picture, wherein the second panoramic picture is a transformed panoramic Figure, 302. The construction is performed by computing a geometrical transformation from of the first panoramic picture in accordance with the replacement vector.

The constructed second transformed panoramic picture is then encoded into a video stream, step 303. The encoding step includes encoding of the replacement vector. The replacement vector is associated into the video stream so that when the video stream is later being decoded the first panoramic picture that represents the original picture can be constructed using backward transformation in accordance with the replacement vector. As can be seen in Figure the encoded data 304 includes both the second transformed panoramic picture and the replacement vector.

Figure 4:
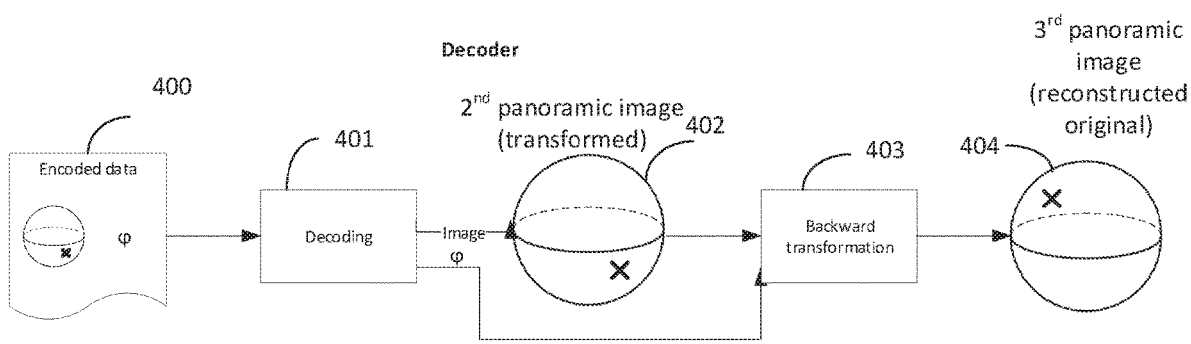
FIG. 4 illustrates an example of decoding process.

In FIG. 4 an example decoding process is shown. The process is explained in view of the encoding process of FIG.

3 for providing better understanding. In the process an encoded data is received, 400. The encoded data comprises a panoramic picture and a replacement vector, which corresponds with the encoded data 304 of FIG. 3. Then the received encoded data is decoded, 401. In the decoding process the panoramic picture is decoded and the replacement vector is extracted from the received encoded data. The result is a panoramic picture 402 that has been transformed using the extracted replacement vector. Thus, the transformed panoramic picture 402 corresponds to the second panoramic picture 302 of FIG. 3.

At the post processing phase 403 a backward transformation is applied to the second panoramic picture 402 in accordance with the replacement vector. As an outcome a third panoramic picture 404 is achieved. The third panoramic picture 404 is a reconstructed copy of the original panoramic picture, which is in this example the first panoramic picture 300 of FIG. 3.

Even if the result is a reconstructed copy of the first panoramic picture it is understood that it may not be necessarily identical. Deviations may be caused by, for example lossy compression algorithms, or other algorithms that irreversibly change the picture during pre-processing, encoding, decoding or post-processing.

Figure 5:
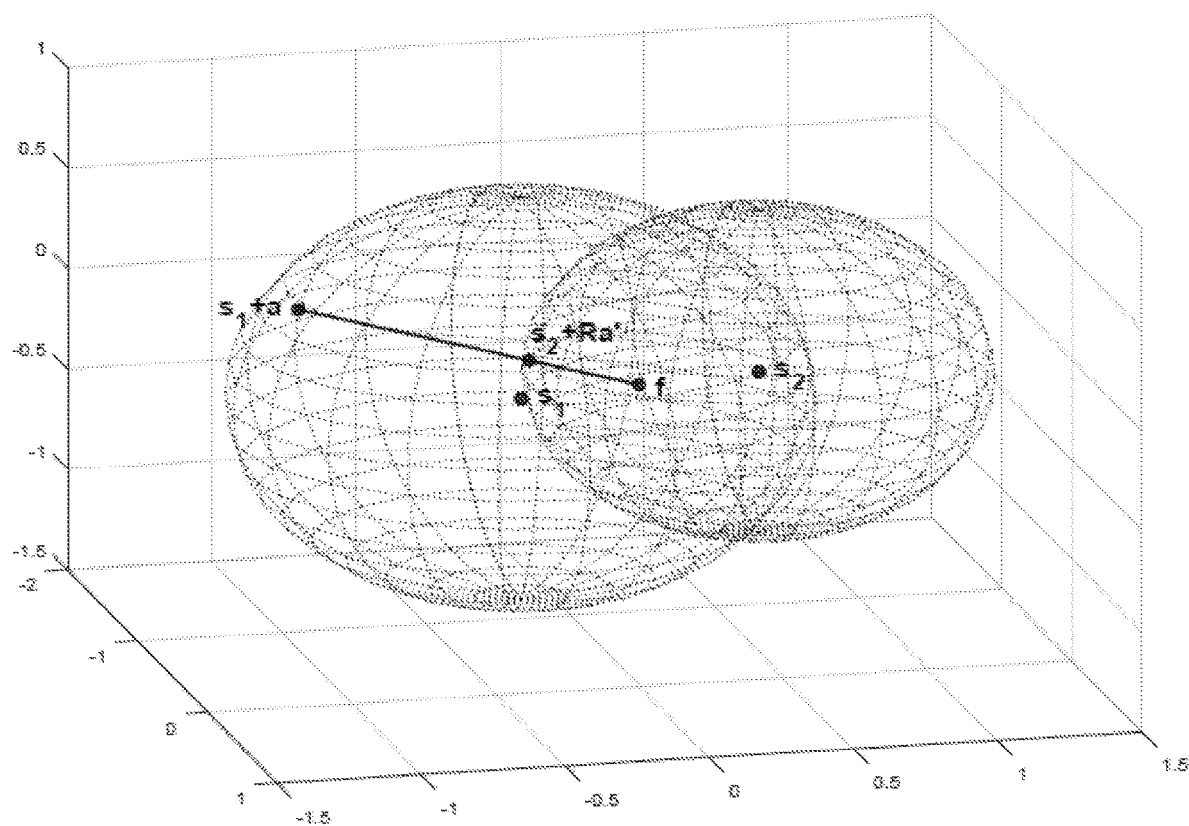
FIG. 5 illustrates an example of a geometrical transformation.

In FIG. 5 an example of a geometrical transformation is shown. In the following the principles of the geometrical transformation of FIG. 5 are explained. However, a person skilled in the art understands that the similar principles may be used in various geometrical transformations. Examples of transformations include zoom, perspective change, rotation and panning.

A three-dimensional sphere centered at Si represents the initial panoramic picture or spherical picture. In the following 52 denotes the shifted center of the transformed spherical picture and R the scaling factor of the radius, i.e. the shifted sphere has a radius R, assuming a radius equal to 1 for the initial sphere. In the following, f represents the focal point of both pictures, so that any considered ray of light goes through f Without loss of generality, the f can be considered to represent the origin of the Cartesian coordinate system, i.e.

$$f=(0,0,0)^T$$

In the following $a=(ax, ay, az)^T$ denotes the local coordinates of a pixel at the surface of the initial sphere that is centered at coordinate Si. We denote by $a'=(ax', ay', az')^T$ the local coordinates of the transformed pixel at the surface of the normalized version of the shifted sphere that is centered at coordinate $s_2$.

Then, $s_2+Ra'$ results in the intersection of the ray of light going through $s_1+a$ and focal point f Therefore, after some calculus, point a' satisfies the following equation $$T(a) = a' = \frac{\rho}{R}(s_1 + a) - \frac{1}{R}s_2$$

$$\text{with } \rho = \frac{s_2^T(s_1+a)\sqrt{(s_2^T(s_1+a))^2 - \|s_1+a\|^2(\|s_2\|^2 - R^2)}}{\|s_1+a\|^2}.$$

One can recover the initial picture from the transformed spherical picture through the following backward mapping:

$$T^{-1}(a') = a = \rho'(s_2 + Ra') - s_1$$

$$\text{with } \rho' = \frac{s_1^T(s_2+Ra) + \sqrt{(s_1^T(s_2+Ra'))^2 - \|s_2+Ra'\|^2(\|s_1\|^2 - 1)}}{\|s_2+Ra'\|^2}.$$

Note that, if $f=s_2$, the forward transformation simplifies into:

$$a' = \frac{s_1 + a}{\|s_1+a\|}.$$

Furthermore, if $$f = \frac{s_1+s_2}{2}$$

and R=1, the transformations are symmetrical, that is to say $$T^{-1}(a)=-T(-a).$$

It is also possible to use the backward transformation when $f=s_1$, i.e. the projection center of the current frame is used as focal point. This may be convenient in some applications.

The video coding apparatus and method have been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A picture decoding apparatus comprising processing circuitry, wherein the processing circuitry is configured to:
    receive an encoded panoramic picture;
    decode the received encoded panoramic picture;
    compute a geometrical transformation in accordance with a replacement vector, wherein the replacement vector is included with the encoded panoramic picture and the replacement vector determines a difference between a projection center of the received encoded panoramic picture and a projection center of a panoramic output picture; and
    construct the panoramic output picture, wherein the processing circuitry is further configured to transform the decoded panoramic picture in accordance with the computed geometrical transformation.

2. The picture decoding apparatus of claim 1, wherein the geometrical transformation is a backward transformation from a transformed projection center to an original projection center.

3. The picture decoding apparatus of claim 1, wherein the processing circuitry is further configured to use the projection center of the received encoded panoramic picture or the projection center of the panoramic output picture as a focal point.

4. The picture decoding apparatus of claim 1, wherein the processing circuitry is further configured to use a midway point between the projection center of the received encoded panoramic picture and the projection center of the panoramic output picture as a focal point.

5. A picture encoding apparatus comprising processing circuitry, wherein the processing circuitry is configured to:
   receive a panoramic picture;
   construct a transformed panoramic picture by computing a geometrical transformation of the received panoramic picture; and
   encode the transformed panoramic picture, wherein a replacement vector for a projection center is stored with the encoded transformed picture, and the replacement vector comprises a parameter set of the geometrical transformation between a projection center of the received panoramic picture and a projection center of the constructed transformed panoramic picture.

6. The picture encoding apparatus according to claim 5, wherein the geometrical transformation is a forward transformation from an original to a replaced projection center.

7. The picture encoding apparatus of claim 5, wherein the processing circuitry is further configured to use the projection center of the received panoramic picture or the projection center of the constructed panoramic picture as a focal point.

8. The picture encoding apparatus of claim 5, wherein the processing circuitry is further configured to use a midway point between the projection center of the received panoramic picture and the projection center of the constructed panoramic picture as a focal point.

9. A picture decoding method comprising:
   receiving an encoded panoramic picture;
   decoding the received encoded panoramic picture;
   computing a geometrical transformation in accordance with a replacement vector, wherein the replacement vector is included with the encoded panoramic picture and the replacement vector determines a difference between a projection center of the received encoded panoramic picture and a projection center of a panoramic output picture;
   constructing the panoramic output picture; and
   transforming the decoded panoramic picture in accordance with the computed geometrical transformation.

10. The picture decoding method of claim 9, wherein the geometrical transformation is a backward transformation from a transformed projection center to an original projection center.

11. The picture decoding method of claim 9, wherein the method further comprises using the projection center of the received encoded panoramic picture or the projection center of the panoramic output picture as a focal point.

12. The picture decoding method of claim 9, wherein the processing circuitry is further configured to use a midway point between the projection center of the received encoded panoramic picture and the projection center of the panoramic output picture as a focal point.

13. A picture encoding method comprising:
   receiving a panoramic picture;
   constructing a transformed panoramic picture by computing a geometrical transformation of the received panoramic picture; and
   encoding the transformed panoramic picture, wherein a replacement vector for a projection center is stored with the encoded transformed panoramic picture, and the replacement vector comprises a parameter set of the geometrical transformation between a projection center of the received panoramic picture and a projection center of the transformed panoramic picture.

14. The picture encoding method according to claim 13, wherein the geometrical transformation is a forward transformation from an original to a replaced projection center.

15. The picture encoding method of claim 13, wherein the method further comprises using the projection center of the received panoramic picture or the projection center of the constructed panoramic picture as a focal point.

16. The picture encoding method of claim 13, wherein the method further comprises using a midway point between the projection center of the received panoramic picture and the projection center of the transformed panoramic picture as a focal point.

* * * * *